US005092796A

United States Patent [19]

Simon

[11] Patent Number: 5,092,796

[45] Date of Patent: Mar. 3, 1992

[54] SUPPRESSOR CONNECTION SYSTEM

[76] Inventor: Hans Simon, Bruchhausener Strasse, D-5463 Unkel/Rhein, Fed. Rep. of Germany

[21] Appl. No.: 492,910

[22] Filed: Mar. 13, 1990

[51] Int. Cl.[5] ............ H02H 3/20

[52] U.S. Cl. ............ 439/673; 361/127

[58] Field of Search ............ 439/620, 621, 622, 709, 439/332-337, 342, 673, 674, 801; 310/72, 68 R, 68 C; 361/120, 124, 126-128, 118, 119, 56, 58

[56] References Cited

U.S. PATENT DOCUMENTS

| | | | |
|---|---|---|---|
| 1,935,810 | 11/1933 | McFarlin | 361/127 |
| 2,477,940 | 8/1949 | Ready | 439/674 |
| 3,048,722 | 8/1962 | Baron | 310/72 |
| 3,249,815 | 3/1966 | Henry | 361/127 |
| 4,071,876 | 1/1978 | Benson et al. | 361/119 |
| 4,188,561 | 2/1980 | Pranke et al. | 361/124 |
| 4,794,485 | 12/1988 | Bennett | 361/118 |

FOREIGN PATENT DOCUMENTS

| | | |
|---|---|---|
| 7039560 | 4/1972 | Fed. Rep. of Germany . |
| 8628761.3 | 3/1988 | Fed. Rep. of Germany . |

*Primary Examiner*—Neil Abrams
*Attorney, Agent, or Firm*—Longacre & White

[57] ABSTRACT

A system is provided for connecting a suppressor for eliminating interference from electrical appliances. The system comprises an electrical box provided with a fitting for receiving a suppressor. The suppressor includes a plurality of angularly spaced contact arms. Terminal bodies which define terminal spaces for receiving conductor ends are disposed around the fitting. Terminal screws are provided at the terminal bodies. To electrically connect the suppressor to the conductor ends, the suppressor is inserted into the fitting and then rotated until the contact arms overlie the terminal bodies. The terminal screws are then tightened to simultaneously clamp the conductor ends within the terminal spaces and to clamp the contact arms between heads of the terminal screws and backs of the terminal bodies.

12 Claims, 4 Drawing Sheets

1
2
3
3a
4
5
6
7
8
9
10
II
III
øX
øY

SUPPRESSOR CONNECTION SYSTEM

BACKGROUND OF THE INVENTION

The invention relates to a system for connecting a suppressor to an electrical appliance, according to the preamble to Patent Claim 1. Such a system or such a device is described in German Patent Application P 38 34 626.5 which has not yet been published.

In most cases, electrical appliances must be equipped with a suppressor. Generally, this is a suppressor filter or a suppressor capacitor, and these have to be differently connected.

Suppressor filters are constructed with choke coils for the individual conductors in the mains connection cable. Therefore, for each conductor, two possible electrical connection means have to be provided, namely in each case an input into and an output from the suppressor filter; in the case of an alternating current appliance, therefore, four connections are required as well as a further connection for the earthing lead or safety terminal. All these five electrical connection means must be capable of handling the power of the appliance.

In the case of a suppressor capacitor, only a total of three connections (for N, L and earth) are required, the electrical connection means only having to transmit the interference voltages, which means that they can be much smaller and have a smaller cross-section.

Hitherto, suppressors—e.g. the suppressor according to DE—GM 86 28 761.3—were fitted, wired and connected separately inside the appliances, requiring considerable care, expense and a concomitant amount of time. To change a faulty suppressor the appliance usually had to be opened or partially dismantled, and it is not readily possible to exchange a suppressor capacitor for a suppressor filter or vice versa.

In the device described in the as yet unpublished German Application P 38 34 626.5 mentioned at the outset, there is on the bottom of a cable junction box a fitting to hold a suppressor and alongside the fitting there are the per se conventional screw terminals for the wires of the connecting cable. Integrally formed on these screw terminals or the chambers thereof are respective lateral widened portions, each of which has an upwardly and laterally open insertion slot to hold a contact plate of the filter, each insertion slot having associated with it a spring contact element which is connected to a terminal. Upon insertion of this filter casing, therefore, the wires of the connecting cable are simultaneously connected to the filter.

However, it must always be considered a drawback that, in addition to the per se necessary screw terminals for the wires of the connecting cable, it is also necessary to provide widened portions of the chambers and associated spring contact elements. Apart from that, this connection device is suitable and envisaged for the aforesaid suppressor with the axially extending contact plates.

In contrast, the invention is based on the problem of providing a connection system in which contact elements provided on the suppressor, particularly contact arms, can be directly connected to the screw terminals which are in any event required for connecting the wires of the mains cable, so shortening assembly time and also providing for greater safety; the direct connection method is also intended to enhance suppression efficiency.

The premise adopted in order to resolve this problem is the connection device according to Patent Application P 38 34 626.5 in which the suppressor comprises contact arms which project laterally beyond its contours, there being provided on the bottom of the mains junction box a fitting for holding the suppressor and, alongside the fitting, screw terminals for the wires of the connecting cable. The solution according to the invention resides in that with regard to their angular spacings, length and mounting height, the contact arms are disposed to match the screw terminals so that after the suppressor has been inserted into the fitting, the ends of the contact arms rest on the top of the screw terminals. When tightening up the terminal screws, by which in the past only one end of a conductor (or perhaps a plurality of conductor ends) were connected, according to the invention also the associated contact arm of the suppressor is immediately connected directly to the screw terminal. Preferably, the end of each contact arm has a contact lug/contact plate provided with a pierceable hole or a cut-out for the terminal screw.

In the case of one embodiment, when the suppressor filter is fitted, the contact plate with the pierceable hole comes to rest directly on the back of the screw terminal, whereupon the terminal screw can be inserted through the pierceable hole and screwed up tightly on the screw terminal. Certainly, the back of the terminal screw must be accessible from above, i.e. must have a chamber into which the screw terminal is inserted and which has an appropriate opening in the top. Another embodiment is characterised in that the suppressor is pivotable about its longitudinal axis in the fitting, the contact plate provided with a cut-out being adapted to pivot between the back of the screw terminal and the head of the terminal screw which is at a distance therefrom. For this purpose, the chamber of the screw terminal has a corresponding lateral slot into which the contact plate can pivot.

According to a further development of the invention, the contact arms with the contact lugs are so mounted on the top of a connection cap (moulded from insulating material, e.g. synthetic plastics material) that the inner ends of the contact arms contact the connecting members of the filters and/or coils of the suppressor. This cap has on its underside also two (or even three or more, if desired) mutually concentric circular grooves—according to the diameters of the various filter cases—for optional mounting on the top edge of a filter case. These features are explained in detail in the description of the drawings, in respect of FIGS. 6 and 7.

SUMMARY OF THE INVENTION

The connection system according to the invention provides the following advantages:

1) The hitherto conventional separate mounting, wiring and connection of the suppressor are unnecessary.

2) The suppressor is of necessity positioned where it is most effective being, in fact, connected directly to the mains connection terminals.

3) Connection is effected via screw terminals and is therefore extremely suitable for suppressor filters and suppressor capacitors alike, and is very secure.

4) A faulty suppressor can be exchanged (after-sales service) without problem, optimum exchange facilities being provided.

5) The system can be used equally well for both types of suppressor, in other words the filter type or capacitor type compressor.

If the screw terminals are mounted in insulating housings, then these insulating housings can have at the top appropriate apertures or slots into which the contact lugs can pivot.

Instead of being provided on the bottom of a mains junction box which may need to be inserted into a recess in a wall of the appliance, this connection system can also be mounted directly on or in a wall of an electrical appliance.

DETAILED DESCRIPTION OF THE DRAWINGS

Figures 1, 2, 3:
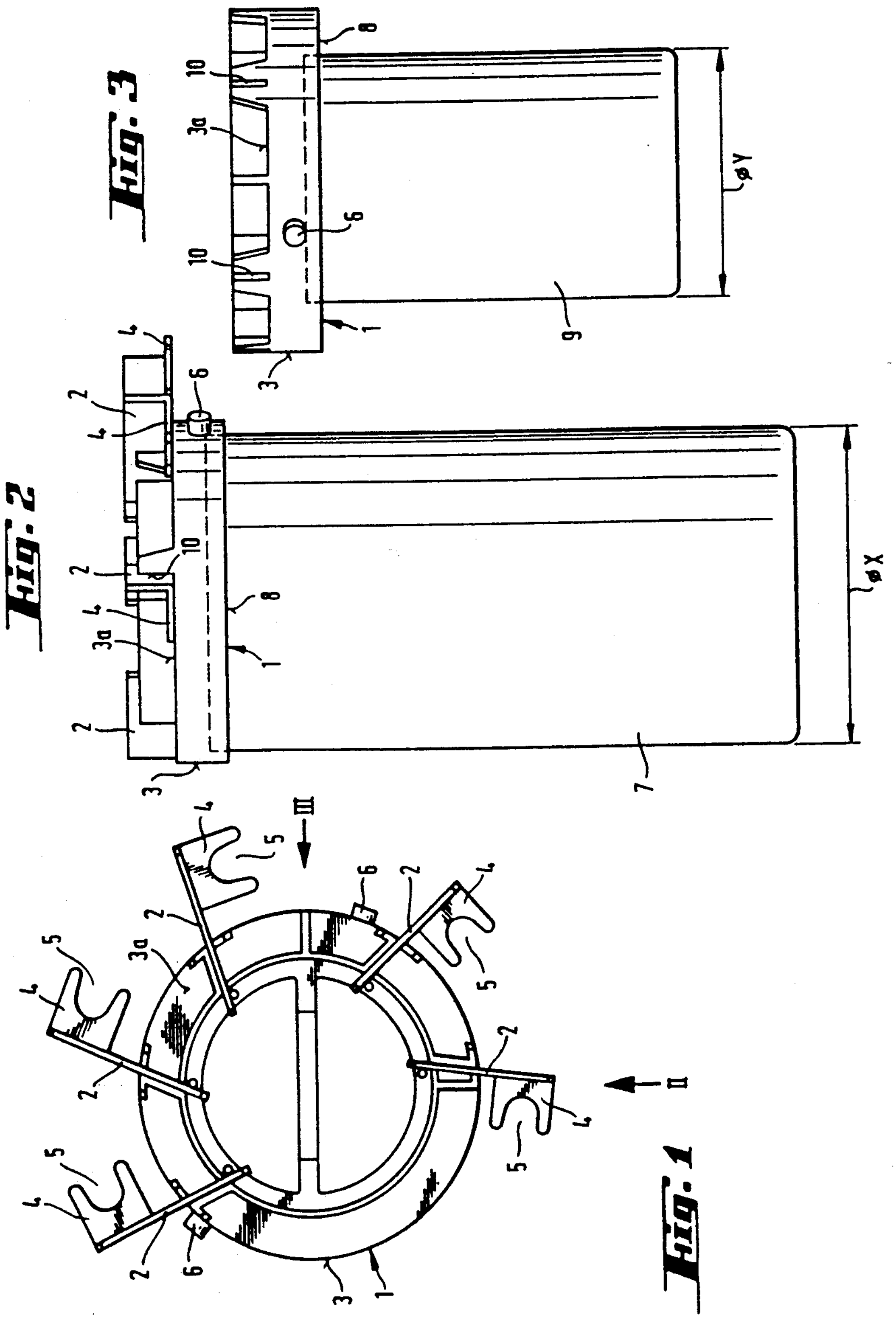
FIG. 1 shows a plan view of cap 1.
FIGS. 2 and 3 are side views of the cap 1.
Figure 4:
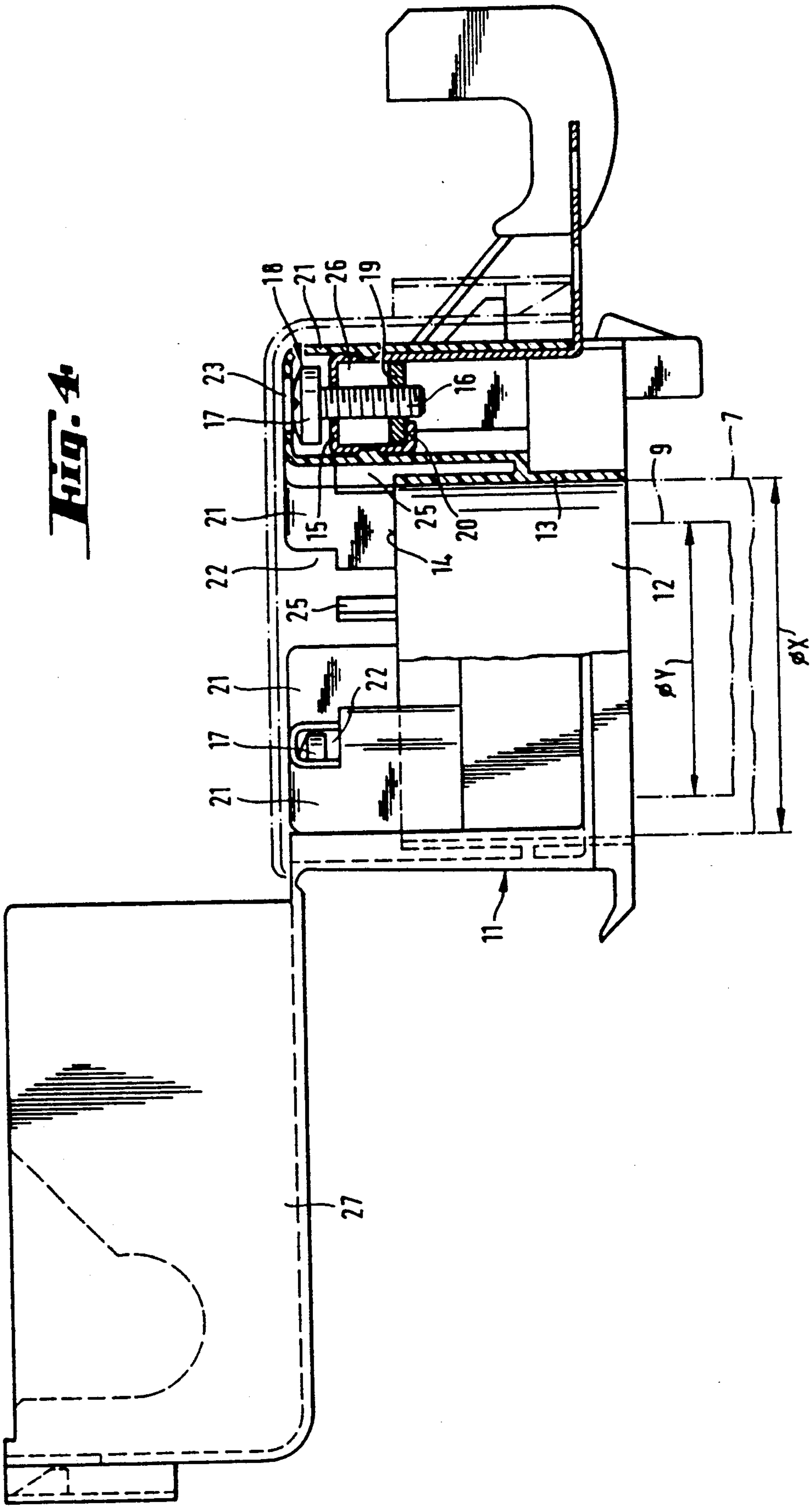
FIG. 4 shows an end elevational view of a cable connection box 11.

The connection system according to the invention is explained in greater detail hereinafter with reference to FIGS. 1 to 7:

FIG. 1 shows in plan view a connection cap 1 according to the invention. Mounted on the top of the cap which is produced from insulating synthetic plastics material there are metal contact arms 2, which project outwardly from the peripheral surface 3 of the cap 1 and carry contact lugs 4, each of which has a perforation or semi-circular cut-out 5. The peripheral face 3 of the cap is provided with two outwardly projecting studs 6;

FIG. 2 is a side view of the cap in FIG. 1 mounted on a suppressor filter 7. The contact arms 2 are of angled shape but can also be flat. The cap 1 has a bearing shoulder 8;

FIG. 3 likewise shows a side view of the same cap 1 but this time it is mounted on a (smaller) suppressor capacitor 9, the contact arms 2/4 being removed or not shown so that slots 10 and a bearing surface or top surface 3*a* for angled-over or flat contact arms 2 are visible;

FIG. 4 shows in partially sectional view an end elevation of a cable connection box or junction box 11 constructed with a fitting 12 to hold a suppressor (according to FIGS. 1 to 3). The fitting 12 is constructed on the bottom of the junction box and is an important component of the box. The fitting 12 has an encircling wall or collar 13 with an upper seating surface 14. Disposed concentrically around the fitting and on the bottom plate of the junction box 11 are housings 21. Inserted into each housing 21 is a screw terminal 18 (shown on the right in FIG. 4 in section on the line IV—IV in FIG. 5). The head 17 of a terminal screw 16 in the screw terminal 18 (which is shown in the not yet tightened state) is at a distance from the top or back of a terminal body 15 and is screwed into a terminal nut 19 which is seated on a shoulder 20 of the terminal body 15 which is partially enclosed by the insulating wall of the respective housing 21.

Figure 5:
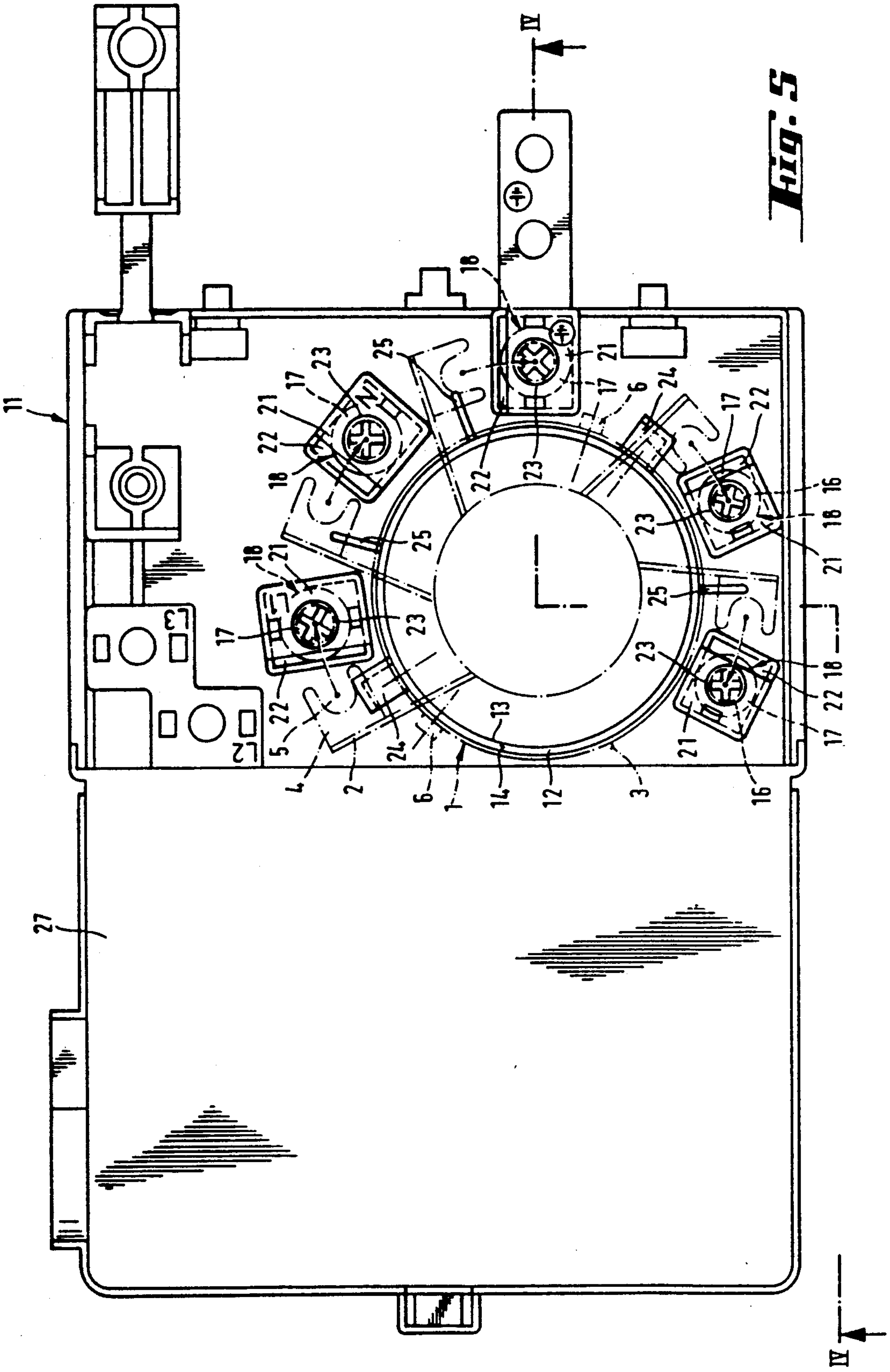
FIG. 5 is a plan view of the FIG. 4 box.

FIG. 5 is a plan view of the junction box 11 shown in FIG. 4. Grouped around the fitting 12 are the housings 21 which include screw terminals 18, windows 22 and actuating apertures 23 for the heads 17 of the terminal screws. Pockets 24 serve to receive the studs 6 on the cap 1. A cover 27 of the junction box is opened about its hinges. If the suppressor filter 7 (diameter X)—or optionally the suppressor capacitor 9 with the smaller diameter Y—onto which the cap is fitted, is pushed into the fitting 12, then the bearing edge 8 of the cap 1 comes to rest on the seating surface 14 and the contact arms 2 with the contact lugs 4 are able to be braced on supports 25 or on the top edge of the pockets, 24. The cap 1 is then rotated clockwise by a few degrees so that the contact lugs 5 move into place between the terminal screw heads 17 and the clamping members 15 and the studs 6 move into the pockets 24. Conductor ends of a mains connecting cable are introduced into a connecting terminal space 26 and the terminal screws 16 are now screwed up tight. Thus, both the contact arms 2 with the contact lugs 4 and at the same time the ends of the wires are contacted. Therefore, there is absolutely no need for separate connection of the suppressor filter.

Figure 6:
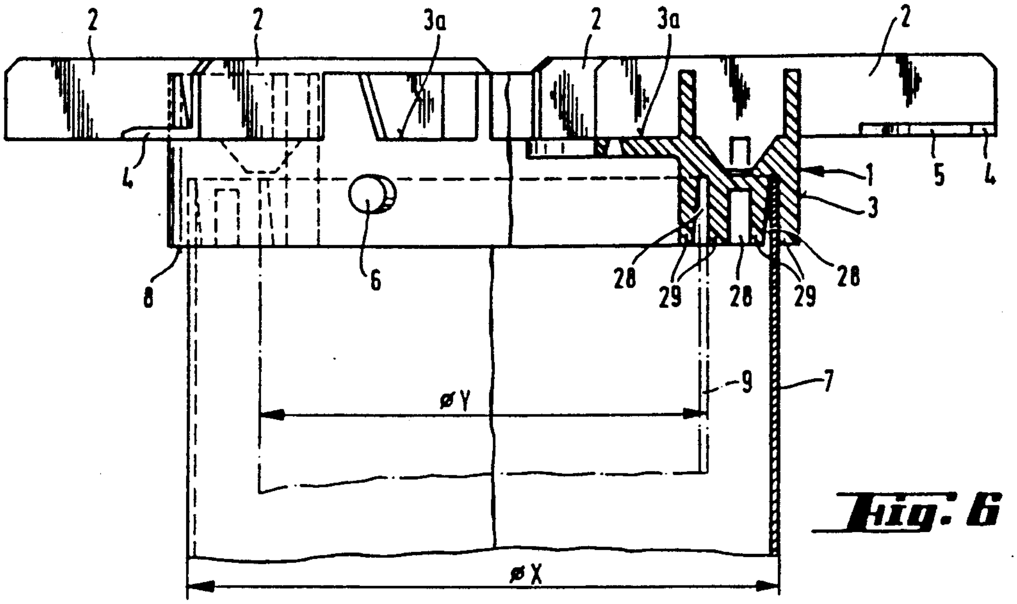
FIGS. 6 and 7 are a side view and a plan view respectively of another embodiment of cap 1.
Figure 7:
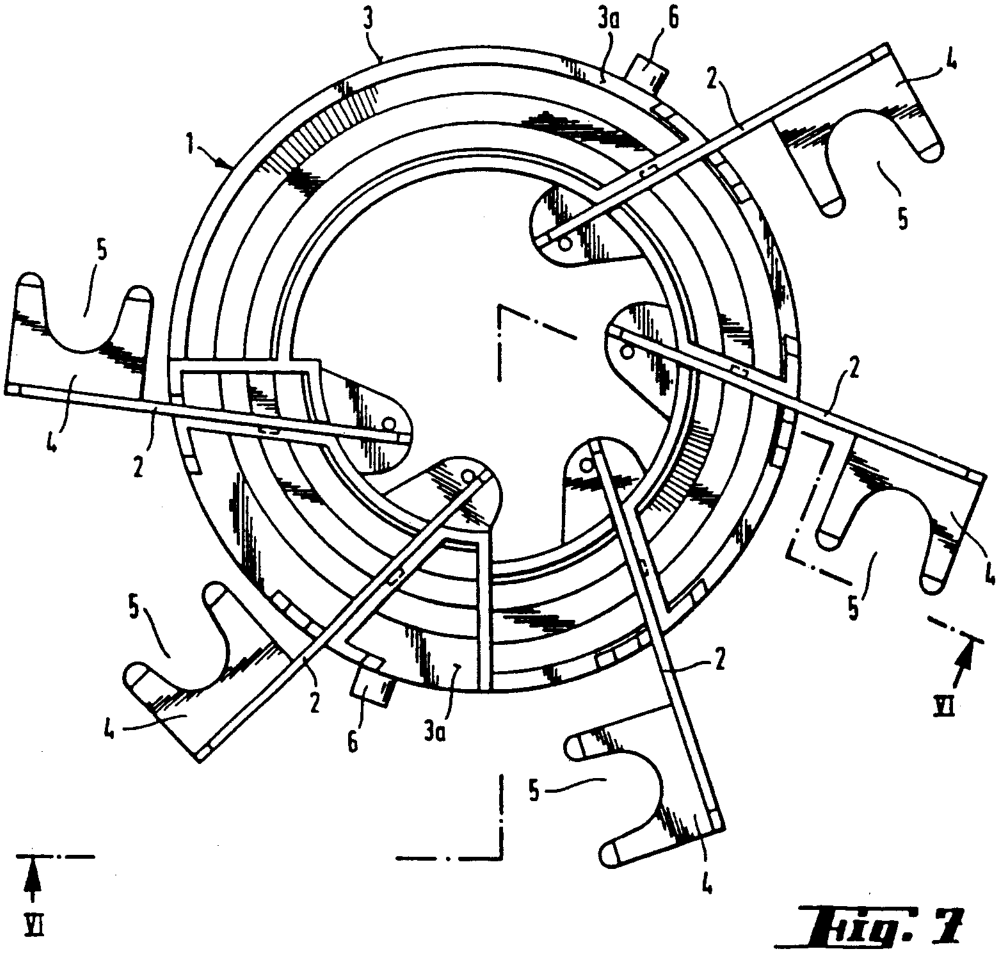

FIGS. 6 & 7 are a side view and a plan view respectively of an embodiment of cap 1 with the contact arms 2 and contact lugs 4 with semi-circular cut-outs 5. The underside of the connection cap 1 has three mutually concentric insertion grooves 28 (or ribs 29) which serve as seating rings to hold or to bear on the open edge of a suppressor case onto which the cap 1 can be pushed. The peripheral face 3 of the cap with the bearing edge 8 forms the contours of the suppressor cap which can be rotatably inserted into the fitting 12 and which can be contacted by the screw terminals, together with the ends of the mains connection cable. It is thus possible optionally to insert into one of the insertion grooves 28 either a smaller diameter suppressor capacitor 9 or a larger suppressor filter 7. The inner ends of the contact arms 2 are thereby so constructed that they optionally contact the connection points of a suppressor capacitor 9 or of a suppressor filter 7.

I claim:

1. A connection system for connecting a suppressor to an electrical appliance, comprising:
   - suppressor means having contact arms projecting therefrom being connected to a fitting of said appliance or mounting said suppressor; and
   - terminal means for the connection of cables to the appliance;
   - wherein said contact arms of said suppressor means are angularly spaced and positioned on said suppressor means so as to correspond to and overlay the respective positions of said terminal means when the suppressor means has been connected to said fitting;
   - whereby pivotal motion of the suppressor means about its longitudinal axis is adapted to shift the contact arms into such terminal overlay position.
2. A connection system as recited in claim 1, wherein:
   - said contact arms of said suppressor means are each provided with a hole therein to accommodate a fastener associated with the terminal means.
3. A connection system as recited in claim 2, wherein:
   - said suppressor means is adapted to pivot within said fitting so that said contact arms can be shifted into place between a back portion of said terminal means and a head portion of said fastener.
4. A connection system as recited in claim 2, wherein:
   - said contact arms are mounted on top of a cap element connected to the suppressor means so that said contact arms contact the internal contact parts of the suppressor means, the cap element including a groove which receives an edge of an outer case of said suppressor means.

5. A connection system as recited in claim 1, wherein the fitting comprises an encircling wall which encircles the suppressor means.

6. A connection system as recited in claim 5, wherein a longitudinal axis is defined by the suppressor means, and wherein the suppressor means is inserted within the fitting and is pivotable within the encircling wall about the longitudinal axis.

7. A connection system as recited in claim 1, wherein a longitudinal axis is defined by the suppressor means, and wherein the suppressor means is inserted within the fitting and is pivotable within the fitting about the longitudinal axis.

8. A suppressor connection system for connecting a suppressor to a plurality of electrical conductors of an electrical device, comprising:

a plurality of contact arms projecting from the suppressor;

fitting means provided on said electrical device for rotatably receiving the suppressor therein;

a plurality of terminal means provided around the fitting for receiving, respectively, the plurality of electrical conductors;

means for electrically connecting each one of the contact arms to a respective one of the terminal means, wherein the plurality of contact arms are angularly spaced about an axis of the suppressor and positioned on the suppressor so as to overlay respective positions of the plurality of terminal means when the contact arms of the suppressor have been connected to the terminal means after the suppressor has been inserted within the fitting means.

9. A suppressor connection system as recited in claim 8, wherein each terminal means comprises a terminal body provided with a terminal space for receiving one of the electrical conductors, and wherein a fastener means is associated with each of the terminal means for clamping the respective electrical conductor within the respective terminal space.

10. A suppressor connection system as recited in claim 8, wherein, for each terminal means, the terminal body comprises a back and the fastener means comprises a screw having a screw head, and wherein the suppressor is rotatable within the fitting means to cause the contact arms to be moved into place between the back of said terminal body and the screw head of said fastener means.

11. A suppressor connection system as recited in claim 9, wherein, for each terminal means, a terminal nut is provided within the terminal body so as to be threadingly received on a threaded shank of the screw and the screw head is adapted to be tightened in order to clamp the respective electrical conductor within the terminal space and to clamp the respective contact arm between the screw head and the back of the terminal body in a single operation.

12. A suppressor connection system as recited in claim 8, wherein the fitting means comprises an encircling wall which encircles the suppressor.

* * * * *